C. LE G. FORTESCUE.
ELECTRICAL DISTRIBUTING SYSTEM.
APPLICATION FILED MAY 2, 1917.
1,396,826.
Patented Nov. 15, 1921.
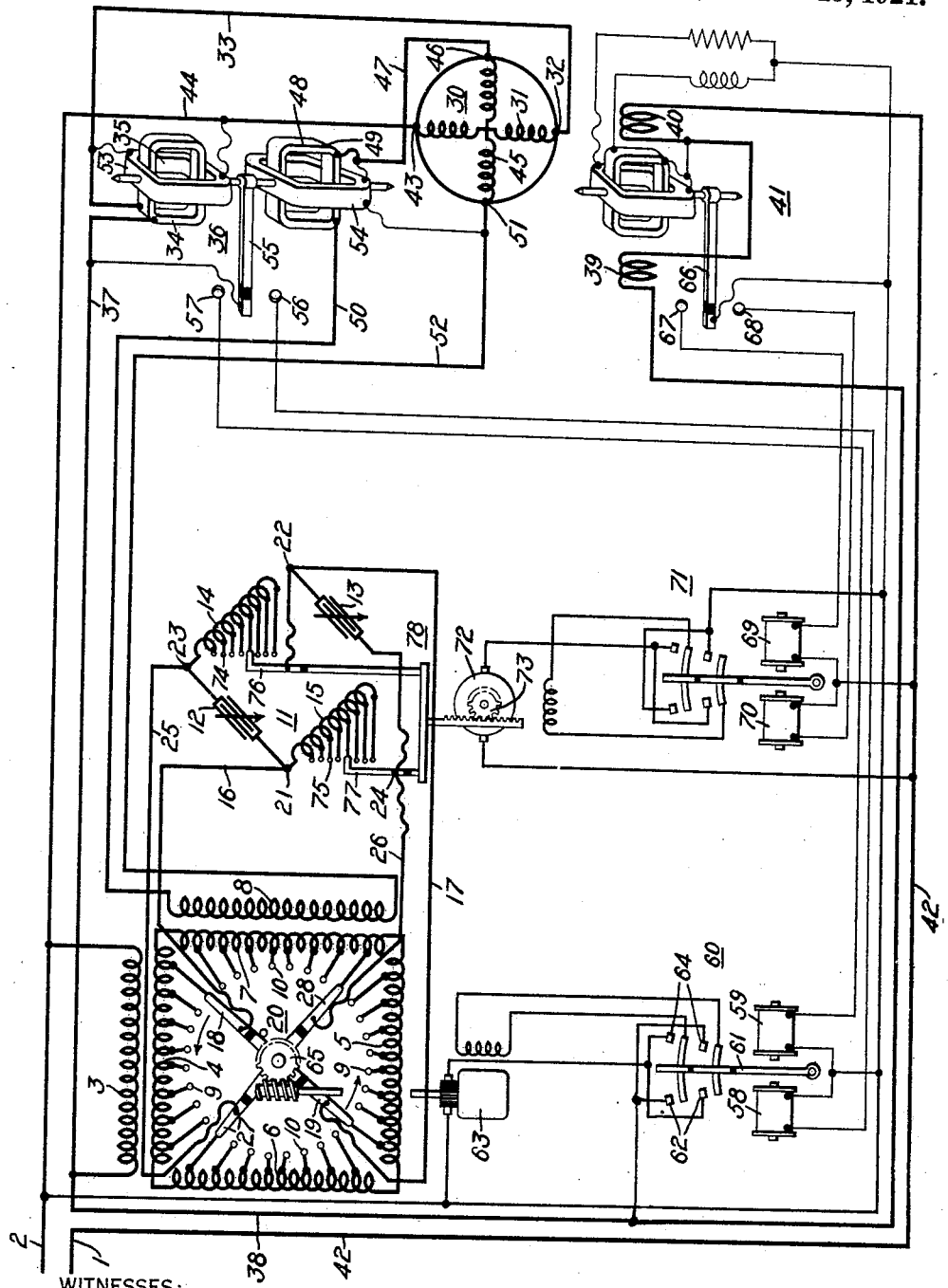
WITNESSES:
R. J. Fitzgerald.
Geo. W. Hansen.
INVENTOR
Charles Le G. Fortescue.
BY
ATTORNEY

UNITED STATES PATENT OFFICE.

CHARLES Le G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL DISTRIBUTING SYSTEM.

1,396,826.  Specification of Letters Patent.  Patented Nov. 15, 1921.

Application filed May 2, 1917. Serial No. 165,863.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Electrical Distributing Systems, of which the following is a specification.

My invention relates to alternating-current distributing systems and it has special relation to phase-modifying means whereby polyphase apparatus, such as motors, generators, rotary converters and the like, may be operated from single-phase power-supply circuits.

More particularly, my invention relates to voltage phase-modifying devices and control systems therefor, whereby balanced polyphase conditions may be maintained in the polyphase load circuits and, if desired, a substantially constant power-factor of high value in the single-phase power-supply circuit.

By means of my present invention, the voltage, which is one of the component polyphase voltages and is derived from a static-type phase-converter, may be automatically controlled to assume a constant predetermined phase relationship with reference to another one of the component polyphase voltages which is derived directly from a single-phase supply circuit. At the same time, the power-factor obtaining in the single-phase power-supply circuit may be maintained at unity value, thus insuring economical transmission of the power that is supplied to the polyphase load circuits. In consequence thereof, polyphase apparatus, such as I have indicated above, may be economically and efficiently operated from a single-phase power-supply circuit with results that compare favorably with those obtained when the polyphase apparatus is operated on polyphase power-supply circuits of the usual character.

To effect the desired phase modification or conversion, I contemplate the use of a monocyclic-square device inserted between the single-phase source of energy and the polyphase consumption apparatus. Such a device comprises two condensive elements and two inductive elements arranged in the form of a closed square, the inductive elements alternating in position with the condensive elements and the single-phase voltage being impressed across one diagonal of the square while the derived or quadrature voltage is taken from the other corners of the square. When using such a phase-splitting bridge to effect the conversion of single-phase energy to polyphase energy, there are four independent quantities associated with the operation thereof which may be adjusted in order to maintain balanced conditions in the polyphase load circuits and unity power factor in the single-phase supply circuit. These quantities are the voltage impressed upon the "square", the derived voltage impressed upon the load, the admittances of the condensive arms, and the admittance of the inductive arms. By varying any three of the four quantities, complete control and regulation of the voltage and phase conditions in the system may be maintained.

Since it is somewhat difficult to vary the admittance of the condensive elements, the operation of the phase-modifying device is generally more satisfactory if the desired regulation is obtained by changing the admittance of the inductive arms only. When such a change in the inductive arms is made, both of the above-mentioned voltages must be simultaneously adjusted in order that the required three quantities shall be affected.

One object of my invention is, therefore, to provide adjusting means for the voltage impressed upon the monocyclic square and for the voltage derived from the monocyclic square as well as means for adjusting the inductive arms of the phase-modifying device, and to so control the magnitude of these three quantities that balanced polyphase conditions in the load circuits and unity power factor in the single-phase source of supply are obtained, irrespective of the character of load existing in the polyphase circuits.

In this connection, I find it desirable to arrange the transformer windings, which are to be adjusted to provide the necessary change in voltage, in the form of a closed square, two of the sides of this square being formed by the secondary windings of a transformer while the other two sides of the square comprise the primary windings of a transformer, the secondary winding, corresponding to the last-named primary windings, being impressed with the derived voltage from the phase-modifying device, while the first-named secondary windings are inductively interlinked with a primary winding, which is connected directly to the main, single-phase source of power. By so arranging the transformer windings, I am able to vary, by a single operation, the voltage impressed upon the monocyclic square as well as the voltage which is applied to the derived phase of such polyphase apparatus as may be operated in conjunction with the phase-modifying device.

As will hereinafter appear, I have associated with the above described arrangement of transformer windings, a rotatable member which is adapted to make contact with taps with which each of the windings are provided and thus vary the applied and derived voltage in such manner that these voltages are always maintained in exact quadrature relation, even though their relative magnitude may vary. This arrangement of adjustable transformer windings is extremely desirable, in that a structure of a compact and simple nature is obtained whereby both of the voltages may be regulated through the use of a single controlling element.

For a better understanding of the nature and scope of my invention, reference may be had to the following description and the accompanying drawing, the single figure of which is a diagrammatic view of an alternating-current distributing system embodying one form of my invention.

Referring to the drawings, a single-phase power-supply circuit, comprising mains 1 and 2, furnishes exciting current to a primary winding 3 of a group of transformer windings that also comprises a secondary winding 4 and a secondary winding 5. The windings 3, 4 and 5 are wound upon the same transformer core member (not shown) in a manner well known in the art. A second group of transformer windings, comprising a primary winding 6, a primary winding 7 and a secondary winding 8, is interconnected with the first group of windings, as will be hereinafter explained. The windings 6, 7 and 8 are likewise wound upon the same transformer core member (not shown). The windings 4 and 5, having the same number of turns, are provided with a plurality of correspondingly positioned taps 9 and, similarly, the windings 6 and 7, having the same number of turns, are provided with a plurality of correspondingly positioned taps 10.

A voltage phase-modifying device 11, comprising a plurality of condensive reactance elements 12 and 13 and a plurality of inductive reactance elements 14 and 15 that alternate in position in a closed circuit with the elements 12 and 13, is employed for securing a dephased voltage that, in combination with a voltage derived directly from the single-phase power-supply circuit, may be utilized in polyphase load circuits.

The voltage phase-modifying device 11 is supplied with an exciting voltage through mains 16 and 17 that are respectively connected to opposite arms 18 and 19 of a rotatable spider element 20. The arms 18 and 19 serve as contact-making members and are adapted to engage the taps 9 with which the windings 4 and 5 are supplied. The arm 18 is so positioned with reference to the arm 19 that it engages a high-potential tap on the secondary winding 4 when the arm 19 engages a correspondingly positioned low-potential tap on the winding 5, and vice versa. The voltage obtaining between the contact arms 18 and 19 is, therefore, equal to the difference of potential between the respective voltage taps that, for the time being, are engaged by said arms.

Since the voltage phase-modifying device 11 is excited by a voltage impressed upon points 21 and 22 by the conductors 16 and 17, respectively, a dephased or derived voltage is impressed upon points 23 and 24 of the phase-modifying device 11. The broad features of system using a "monocyclic square" phase-converting device are fully described and claimed in my copending application, Serial No. 83748, filed March 13, 1916, Patented November 12, 1918, No. 1,284,293, and assigned to the Westinghouse Electric & Manufacturing Company. In that application, the manner in which two condensive arms and two inductive arms are alternately connected to form a closed or "monocyclic square", as well as the mode of operation of such device when used as a phase-splitting bridge, are fully described. It should be noted, in this connection, that such a combination of condensive and inductive elements is extremely desirable in obtaining a phase multiplication since, only through use of condensive and inductive devices is it possible to obtain the desired phase conversion with the minimum loss of energy.

The points 23 and 24 of the phase-modifying device 11 are connected by means of leads 25 and 26, respectively, to arms 27 and 28 of the rotatable spider element 20. The arms 27 and 28 engage the voltage taps 10 formed on the primary windings 6 and 7, respectively, and they are so positioned with respect to each other that, when one arm occupies a low-potential tap on one of the primary windings, the other arm occupies a correspondingly positioned high-potential tap upon the other primary winding, and vice versa. The resultant electromotive force, therefore, influencing the secondary winding 8 is equal to that impressed across the arms 27 and 28 by means of the voltage phase-modifying device 11.

To one familiar with the electrical characteristics possessed by a voltage phase-modifying device, such as is shown at 11, it is apparent that the voltage induced in the secondary winding 8 is displaced in phase from that impressed upon the primary winding 3. In the present instance, I desire to maintain a ninety-degree phase relationship between the voltages obtaining in the primary winding 3 and the secondary winding 8 in order to supply balanced polyphase currents to a two-phase load circuit, shown as a two-phase induction motor 30.

An independent phase winding 31 of the induction motor 30 has one of its terminals 32 connected, through a main 33, a current coil 34 of an upper wattmeter element 35 that is embodied in a differential wattmeter relay 36, leads 37 and 38, current coils 39 and 40 of a power-factor relay 41, and a lead 42, to the main 1. Another terminal 43 of the independent phase winding 31 is connected directly to the main 2 through a lead 44. A derived phase winding 45 of the induction motor 30 has one of its terminals 46 connected, through a lead 47, a current coil 48 of a lower wattmeter element 49 that is embodied in the differential wattmeter relay 36, and a lead 50, to one terminal of the secondary winding 8. The other terminal 51 of the derived phase winding 45 is connected directly to the other terminal of the secondary transformer winding 8 through a lead 52. In the wattmeter relay 36, a voltage coil 53 of the upper wattmeter element 35 is connected across the phase winding 31 and a voltage coil 54 of the lower wattmeter element 49 is connected across the phase winding 45.

The wattmeter relay 36 is of a usual form and comprises a rotatable contact-making arm 55 which may engage either a contact member 56 or a contact member 57, depending upon whether the upper wattmeter element 35 or the lower wattmeter element 49 exerts the predominating torque. When equal amounts of power are supplied to the phase windings 31 and 45 of the induction motor 30, the contact-making arm 55 occupies a mid position between the contact members 56 and 57. When the power demands in the polyphase circuits are unequal, either an electromagnet 58 or an electromagnet 59 of a reversing switch 60 will be energized by the relay 36, depending upon whether the contact member 56 or the contact member 57 is engaged by the rotatable arm 55. When the electromagnet 58 is energized, a pivoted arm 61 of the switch 60 is moved to such position as to establish electrical circuits through contact members 62. In consequence thereof, an alternating-current motor 63 will be energized and rotated in a predetermined direction. When the electromagnet 59 is energized, circuits will be established by the arm 61 through contact members 64 which will energize the motor 63 and cause it to rotate in an opposite direction.

The motor 63, through a worm-and-wheel mechanism 65, is instrumental in rotating the spider member 20 upon which the contact-making arms 18, 19, 27 and 28 are secured. The active lengths of the secondary windings 4 and 5 are, therefore, simultaneously varied with the active lengths of the primary windings 6 and 7.

The power-factor relay 41, which is inserted in the single-phase power-supply circuit, is of a usual form and comprises a rotatable contact-making arm 66 which is adapted to engage either a contact member 67 or a contact member 68, depending upon whether the power-factor obtaining in the single-phase circuit is the result of a leading or a lagging current. When the power-factor of the single-phase circuit is substantially unity, the arm 66 occupies a mid position between the contact members 67 and 68. When the power factor of the single-phase circuit varies from unity, the rotatable arm 66 will engage either the contact member 67 or the contact member 68, thereby energizing the one or the other of electromagnets 69 and 70 of a reversing switch 71. The reversing switch 71 controls the direction of rotation of an alternating-current motor 72 which actuates a rack-and-pinion mechanism 73.

The similar inductive elements 14 and 15 of the voltage phase-modifying device 11 are provided with a plurality of correspondingly positioned taps 74 and 75, respectively, with which insulated arms 76 and 77 of an adjusting rack 78 engage. The rack 78 is actuated by the rack-and-pinion mechanism 73 and varies the amount of inductive reactance connected in the inductive arms of the voltage phase-modifying device 11. By simultaneously varying the inductive admittance of the elements 14 and 15, the ratio between the condensive admittance and the inductive admittance of the phase-modifying device 11 may be varied. In consequence thereof, the value and phase position of the voltage derived from the device 11 may be controlled as the load on the motor 30 varies.

As explained in the aforementioned copending patent application, unity power factor obtains in the single-phase power-supply circuit of the distributing system when balanced polyphase conditions obtain in the polyphase load circuits that are interconnected through the intermediary of the voltage phase-modifying device 11 with the sin-ple-phase power-supply circuit. Under these conditions, the voltage impressed upon the independent phase winding 31 of the motor 30 is equal to, and displaced ninety degrees from, the voltage impressed upon the derived phase winding 45.

When the power-factor of the single-phase supply circuit varies from unity the ratio between the admittances of the bridge arms is varied automatically by means of the motor 72 which is instrumental in varying the inductances of the elements 14 and 15 by means of the rack 78. The motor 72 will be properly energized through the power-factor relay 41 and the switch mechanism 71 until unity power-factor is restored in the single-phase power-supply circuit. However, when the power-factor relay 41 departs from its neutral position, unequal amounts of power are consumed in the polyphase load circuits. As a result, the differential wattmeter relay 36 energizes the motor 63 in order to vary the active lengths of the interconnected transformer windings 4, 5, 6 and 7. The motor 63, through the selective action of the relay 36, therefore, simultaneously varies the voltages impressed upon the voltage phase-modifying device 11, as well as, the voltages influencing the secondary winding 8. When the voltage obtaining in the secondary winding 8, and, therefore, in the derived phase winding 45 of the motor 30, is equal to, and displaced ninety degrees in phase from, the voltage obtaining in the independent phase winding 31, and in the event of the power-factor relay 41 occupying its neutral position, the differential wattmeter relay 36 occupies its neutral position thereby indicating that balanced polyphase conditions are restored in the polyphase circuits.

While I have shown one preferred form of my invention, what I believe to be broadly new, as pointed out in the appended claims, is the use of a phase-splitting device comprising inductive and condensive arms, in which the admittances of the arms of one character are maintained constant while the admittances of the other arms are varied and in which both the voltage impressed upon the phase-splitting bridge and the voltage derived from said bridge are varied, the variation or adjustment of these three independent quantities resulting in the maintenance of balanced polyphase conditions in the load circuits as well as the preservation of unity power factor in the single-phase source of supply.

While I have shown and described one embodiment only of my invention, it is to be understood that this embodiment is susceptible of many modifications and I do not desire to be limited, therefore, to the form of my invention herein specifically illustrated unless such modifications departing therefrom are not within the purview of the appended claims.

I claim as my invention:

1. The combination with a single-phase circuit and a polyphase circuit, of a phase-splitting device comprising aggregates of condensive and inductive reactance elements alternating in position with one another in a closed circuit for interconnecting said single-phase circuit and said polyphase circuit, means for adjusting the elements of one only of said aggregates, and means responsive to the power factor of said single-phase circuit for controlling said adjusting means.

2. The combination with a single-phase circuit and a polyphase circuit, of a phase-splitting device comprising a condensive aggregate and an inductive aggregate for interconnecting said single-phase circuit and said polyphase circuit, means for varying the magnitude of one only of said aggregates, means for varying the voltage impressed upon said phase-splitting device, means for varying the derived voltage which is supplied to said polyphase circuit, means responsive to load conditions in said polyphase circuit for simultaneously controlling said voltage-varying means, and means responsive to the power factor of said single-phase circuit for controlling said means for varying the magnitude of one of said aggregates.

3. The combination with a single-phase circuit and a polyphase circuit, of a phase-splitting device comprising a condensive aggregate and an inductive aggregate for interconnecting said single-phase circuit and said polyphase circuit, means for varying the voltage impressed upon said phase-splitting device, means for varying the derived voltage which is supplied to said polyphase circuit, and means responsive to load conditions in said polyphase circuit for simultaneously controlling said voltage-varying means.

4. The combination with a voltage phase-modifying device, of two groups of primary and secondary transformer windings, similar secondary windings of the first group being interconnected through said voltage phase-modifying device with similar primary windings of the second group, correspondingly positioned taps on each of said windings, and means for adjusting said taps in order to vary the voltage impressed upon said voltage phase-modifying device by means of the secondary windings of said first group and to vary the voltage induced in the secondary winding of said second group of windings.

5. The combination with a single-phase circuit and a voltage phase-modifying device, of two groups of primary and secondary transformer windings, the first group comprising a primary winding impressed with the voltage of the single-phase circuit and a pair of similar secondary windings furnishing an exciting voltage to said voltage phase-modifying device, the second group comprising a pair of similar primary windings impressed with the voltage derived from said voltage phase-modifying device and a secondary winding supplying a dephased voltage, said pairs of windings being arranged in the form of a square having correspondingly positioned taps, and means for adjusting said taps.

6. The combination with a voltage phase-modifying device, of two groups of primary and secondary transformer windings, a pair of secondary windings of the first group furnishing an exciting voltage to said voltage phase-modifying device and a pair of primary windings of the second group being impressed with the voltage derived from said phase-modifying device, and means for simultaneously varying the magnitude of the voltage generated in each of said secondary windings and said primary windings.

7. The combination with a single-phase circuit and a polyphase load circuit, of a voltage phase-modifying device, means for varying the value of the voltage impressed upon said device and the dephased voltage derived from said device, comprising two groups of primary and secondary windings, the secondary windings of the first group furnishing an exciting voltage to said voltage phase-modifying device and the primary windings of said second group being impressed with the dephased voltage derived from said voltage phase-modifying device, and means dependent upon the varying conditions in said load circuit for automatically and simultaneously varying the magnitude of the voltage generated in said secondary windings and said primary windings.

8. In an alternating-current distributing system, the combination with a single-phase power-supply circuit, polyphase load circuits, and a voltage phase-modifying device connected with said circuits to enable polyphase apparatus to operate on said single-phase supply circuit, of two groups of primary and secondary transformer windings, a primary winding of the first group being connected to said single-phase supply circuit, secondary windings of the first group furnishing an exciting voltage to said phase-modifying means, primary windings of the second group being impressed with a dephased voltage derived from said phase-modifying means, and a secondary winding of the second group comprising one phase of said polyphase circuits, and means for varying the magnitude of the voltage generated in said transformer windings connected to said phase-modifying device whereby the value of the voltage derived therefrom is adjusted in order to restore the desired phase relations in the polyphase load circuits and unity power factor in the single-phase supply circuit in case of departure therefrom.

9. In an alternating-current distributing system, the combination with a single-phase power-supply circuit, polyphase load circuits, and a voltage phase-modifying device connected to said circuits and comprising a plurality of condensive and inductive reactance elements alternating in position with one another to form arms that are connected in a closed circuit, of two groups of primary and secondary transformer windings, a primary winding of the first group being connected to the single-phase circuit, secondary windings of the first group furnishing an exciting voltage for said voltage phase-modifying device, primary windings of the second group being impressed with a dephased voltage derived from said phase-modifying device, and the secondary winding of the second group comprising one phase of said polyphase load circuits, means for varying the magnitude of the voltage generated in said transformer windings connected to said phase-modifying means, and additional means for varying the ratio between the admittances of the bridge arms, whereby substantially unity power-factor may be maintained in said single-phase supply circuit and substantially balanced polyphase relations in said polyphase load circuits, under all load conditions.

10. The combination with a single-phase circuit and a polyphase circuit, of a phase-splitting device comprising a condensive aggregate and an inductive aggregate for interconnecting said single-phase circuit and said polyphase circuit, means for varying the magnitude of one only of said aggregates, voltage-transforming means for varying the ratio between the impressed and derived voltages of said phase-splitting device, means responsive to load conditions in said polyphase circuit for controlling said voltage-varying means, and means responsive to the power factor of said single-phase circuit for controlling said means for varying the magnitude of one of said aggregates.

11. The combination with a single-phase circuit and a polyphase circuit, of a phase-splitting device comprising a condensive aggregate and an inductive aggregate for interconnecting said single-phase circuit and said polyphase circuit, means for varying the derived voltage which is supplied to said polyphase circuit, and means responsive to load conditions in said polyphase circuit for controlling said voltage varying means.

12. The combination with a single-phase circuit and a polyphase circuit, of a phase-splitting device comprising a condensive aggregate and an inductive aggregate for interconnecting said single-phase circuit and said polyphase circuit, means for varying the voltage impressed upon said phase-splitting device, and means responsive to load conditions in said polyphase circuit for controlling said voltage varying means.

13. The combination with a single-phase circuit and a polyphase circuit, of a phase-splitting device comprising a condensive aggregate and an inductive aggregate for interconnecting said single-phase circuit and said polyphase circuit, voltage transforming means for varying the ratio between the impressed and derived voltages of said phase-splitting device, and means responsive to the load conditions of said phase-splitting device for controlling said voltage varying means.

14. The combination with a single-phase circuit and a polyphase circuit, of a phase-splitting device comprising a condensive aggregate and an inductive aggregate for interconnecting said single-phase circuit and said polyphase circuit, means for varying the magnitude of one only of said aggregates, means for varying the voltage impressed upon said phase-splitting device, and means for varying the derived voltage which is supplied to said polyphase circuit, whereby a constant power factor may be maintained on said single-phase circuit under all load conditions of said phase-splitting device.

15. The combination with a single-phase circuit and a polyphase circuit, of a phase-splitting device comprising a condensive aggregate and an inductive aggregate for interconnecting said single-phase circuit and said polyphase circuit, means for varying the magnitude of one only of said aggregates, and voltage transforming means for varying the ratio between the impressed and derived voltages of said phase-splitting device, whereby a constant power factor may be maintained on said single-phase circuit under all load conditions of said phase-splitting device.

16. The combination with a single-phase circuit and a polyphase circuit, of a phase-splitting device comprising a condensive aggregate and an inductive aggregate for interconnecting said single-phase circuit and said polyphase circuit, and voltage-transforming means for varying the ratio between the impressed and derived voltages of said phase-splitting device.

17. The combination with a single-phase circuit and a polyphase circuit, of a phase-splitting device comprising a condensive aggregate and an inductive aggregate for interconnecting said single-phase circuit and said polyphase circuit, means for varying the voltage impressed upon said phase-splitting device, means for varying the derived voltage which is supplied to said polyphase circuit, and means for simultaneously adjusting said voltage varying means.

18. The method of regulating a phase-splitting device of the type comprising four condensive and inductive reactive devices alternating in position in a closed circuit, which consists in simultaneously varying the applied and derived voltages of said phase-splitting device in accordance with variations in the load conditions.

19. The method of regulating a phase-splitting device of the type comprising four condensive and inductive reactive devices alternating in position in a closed circuit, which consists in varying the relative reactances of said condensive and inductive reactive devices in accordance with variations in the power factor, and in varying the applied and derived voltages of said phase-splitting device in accordance with variations in load conditions, whereby a constant power factor may be obtained at all times.

20. The combination with a polyphase system which is subject to power-unbalance, of a phase-balancer comprising a pair of condensive reactive elements and a pair of inductive reactive elements arranged to have two terminal-voltages of substantially 90° phase displacement, means connecting said polyphase system to the terminals of said phase-balancer, and means for varying the voltage ratios between the respective phases of said phase-balancer and the respective phases of said polyphase system, whereby the power of the various phases of said polyphase system may be balanced.

21. The combination with a polyphase system which is subject to power-unbalance, of a phase-balancer comprising a pair of condensive reactive elements and a pair of inductive reactive elements arranged to have two terminal-voltages of substantially 90° phase displacement, means connecting said polyphase system to the terminals of said phase-balancer, and means for simultaneously varying in opposite directions the voltage ratios between the respective phases of said phase-balancer and the respective phases of said poylphase system, whereby the power of the various phases of said polyphase system may be balanced.

22. A combination as specified in claim 20, including as the means for varying the voltage ratios means responsive to the power unbalance of said polyphase system.

23. A combination as specified in claim 21, including as the means for varying the voltage ratios means responsive to the power unbalance of said polyphase system.

24. The method of balancing a polyphase system by means of a phase-balancer comprising a pair of condensive reactive elements and a pair of inductive reactive elements arranged to have two terminal voltages of substantially 90° phase displacement, which consists in varying the voltage ratios between the respective phases of said phase balancer and the respective phases of said polyphase system in order to balance the power of the various phases of said polyphase system.

25. The method of balancing a polyphase system by means of a phase-balancer comprising a pair of condensive reactive elements and a pair of inductive reactive elements arranged to have two terminal voltages of substantially 90° phase displacement, which consists in simultaneously varying in opposite directions the voltage ratios between the respective phases of said phase balancer and the respective phases of said polyphase system in order to balance the power of the various phases of said polyphase system.

In testimony whereof, I have hereunto subscribed my name this 23rd day of April, 1917.

CHARLES Le G. FORTESCUE.